United States Patent
Dube et al.

(10) Patent No.: US 9,452,389 B2
(45) Date of Patent: Sep. 27, 2016

(54) APPARATUS AND METHOD FOR INTEGRATING DESULFURIZATION AND CARBON DIOXIDE CAPTURE

(71) Applicant: ALSTOM Technology Ltd, Baden (CH)

(72) Inventors: Sanjay Kumar Dube, Knoxville, TN (US); Raymond Raulfs Gansley, Knoxville, TN (US)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 14/193,245

(22) Filed: Feb. 28, 2014

(65) Prior Publication Data

US 2015/0246312 A1 Sep. 3, 2015

(51) Int. Cl.
*B01D 53/75* (2006.01)
*B01D 53/62* (2006.01)
*B01D 53/14* (2006.01)
*B01D 53/50* (2006.01)
*B01D 53/34* (2006.01)
*B01D 53/40* (2006.01)

(52) U.S. Cl.
CPC .......... *B01D 53/62* (2013.01); *B01D 53/1475* (2013.01); *B01D 53/343* (2013.01); *B01D 53/40* (2013.01); *B01D 53/501* (2013.01); *B01D 53/504* (2013.01); *B01D 2251/2062* (2013.01); *B01D 2252/102* (2013.01); *B01D 2258/0283* (2013.01); *Y02C 10/04* (2013.01); *Y02C 10/06* (2013.01)

(58) Field of Classification Search
None
See application file for complete search history.

(56) References Cited

U.S. PATENT DOCUMENTS

| | | |
|---|---|---|
| 7,846,240 B2 | 12/2010 | Gal et al. |
| 7,862,788 B2 | 1/2011 | Gal et al. |
| 8,293,200 B2 | 10/2012 | Dube et al. |
| 8,623,314 B2 | 1/2014 | Muraskin et al. |
| 2010/0083831 A1 | 4/2010 | Gal et al. |
| 2010/0170397 A1 | 7/2010 | Padban |
| 2012/0207658 A1 | 8/2012 | Dube et al. |
| 2012/0258031 A1 | 10/2012 | Guidolin et al. |
| 2013/0042759 A1 | 2/2013 | Koss |
| 2013/0092026 A1 | 4/2013 | Dube |
| 2013/0175004 A1 | 7/2013 | Dube et al. |
| 2013/0186272 A1 | 7/2013 | Balfe et al. |
| 2013/0255495 A1 | 10/2013 | Askander et al. |

FOREIGN PATENT DOCUMENTS

WO    WO2013/144899 A2    10/2013

*Primary Examiner* — Daniel Berns
(74) *Attorney, Agent, or Firm* — Cynthia W. Flanigan (57) ABSTRACT

An method of operating a plant includes the steps of feeding a reagent to a direct contact heating device (32) for removing ammonia from fluid fed to the direct contact heating device (32), feeding water to the direct contact heating device (32) to contact the fluid after the fluid is contacted with the reagent fed to the direct contract heating device (32), and feeding the water from the direct contact heating device (32) to a water wash tower (20) that is downstream of a carbon dioxide absorber (14) configured to use ammonia to remove carbon dioxide from fluid fed therein. The water wash tower (20) can be configured to remove ammonia from the fluid fed therein prior to that fluid being fed to the direct contact heating device (32). A plant and an apparatus for integrating desulfurization and carbon capture are configurable to implement the method.

10 Claims, 3 Drawing Sheets

APPARATUS AND METHOD FOR INTEGRATING DESULFURIZATION AND CARBON DIOXIDE CAPTURE

TECHNICAL FIELD

The present disclosure relates to an apparatus and method for integrating a desulfurization and carbon dioxide capture process.

BACKGROUND

Utility and industrial plants such as power plants, electricity generation plants, waste-to-energy facilities, cement kilns, and other facilities firing fossil fuels such as coal or oil can be configured to capture sulfur dioxides and other acid gases to help ensure clean and environmentally sound power generation. Traditionally, compliance with air emissions limits is achieved through the use of a wet or dry flue gas desulfurization system. Such industrial plants could also include a carbon dioxide capture system to help reduce carbon dioxide emissions. Examples of systems that can be utilized in utility plants to reduce acid gas emissions or carbon dioxide emissions can be appreciated from U.S. Pat. Nos. 8,623,314, 8,293,200, 7,862,788, and 7,846,240, U.S. Patent Application Publication Nos. 2010/0083831, 2010/0170397, 2012/0258031, 2013/0092026, 2013/0186272 and 2013/0255495 and International Publication No. WO 2013/144899.

Operating costs and capital costs associated with operation of systems configured to reduce acid gas emissions and carbon dioxide emissions can be relatively high. The relatively high costs associated with such systems can be necessary to ensure the efficiency and effectiveness of such systems complies with air emission limits to ensure clean and environmentally sound power generation.

SUMMARY

According to aspects illustrated herein, there is provided a method for operating a plant that includes the steps of feeding a reagent to a direct contact heating device for removing ammonia from fluid fed to the direct contact heating device prior to that fluid being sent to an outlet stack, feeding water to the direct contact heating device to contact the fluid after the fluid is contacted with the reagent fed to the direct contact heating device, and feeding the water from the direct contact heating device to a water wash tower that is downstream of a carbon dioxide absorber configured to use ammonia to remove carbon dioxide from fluid fed therein. The water wash tower is configured to remove ammonia from fluid fed therein.

According to other aspects illustrated herein, an apparatus for integrating desulfurization and carbon capture within a plant comprises a direct contact heating device and a water wash tower that is downstream of a carbon dioxide absorber configured for using ammonia to remove carbon dioxide from fluid fed therein. The water wash tower can be configured for removing ammonia from fluid fed to the water wash tower. A water wash tower water feed conduit can be configured to connect the direct contact heating device to the water wash tower such that water fed to the direct contact heating device is transportable to the water wash tower after having passed through the direct contact heating device to heat a fluid passing through the direct contact heating device.

According to other aspects illustrated herein a plant includes a direct contact heating device configured to heat flue gas fed therein, a source of an acidic reagent connected to the direct contact heating device for feeding the reagent to flue gas passing through the direct contact heating device, a water wash tower configured for removing ammonia from the flue gas fed to the water wash tower, a wet desulfurization device configured to remove sulfur oxides from flue gas fed therein, a direct contact cooling device configured for cooling flue gas passed therethrough, and a carbon dioxide absorber device configured to utilize ammonia to assist in removing carbon dioxide from flue gas passed therethrough where the carbon dioxide absorber is upstream of the water wash tower. The plant can also include a water wash tower water feed conduit configured to connect the direct contact heating device to the water wash tower such that water fed to the direct contact heating device is transportable to the water wash tower after having passed through the direct contact heating device to heat the flue gas passing through the direct contact heating device after that flue gas was contacted with the reagent fed to the direct contact heating device, a direct contact cooling device flue gas feed conduit configured to connect the direct contact cooling device to the wet desulfurization device such that flue gas fed to the wet desulfurization device is transportable to the direct contact cooling device after having passed through the wet desulfurization device, a carbon dioxide absorber feed conduit configured to connect the direct contact cooling device to the carbon dioxide absorber such that the flue gas fed to the direct contact cooling device is transportable to the carbon dioxide absorber after having passed through the direct contact cooling device, a water wash tower flue gas feed conduit configured to connect the carbon dioxide absorber to the water wash tower such that the flue gas fed to the carbon dioxide absorber is transportable to the water wash tower after having passed through the carbon dioxide absorber so that ammonia within that flue gas is removable from the flue gas, and a direct contact heating device feed conduit configured for connecting the water wash tower to the direct contact heating device such that flue gas treated by the water wash tower is transportable to the direct contact heating device to be heated by the direct contact heating device. The flue gas transported from the water wash tower to the direct contact heating device can have a concentration of ammonia that is at or below 500 parts per million. The plant can also include a desulfurization device water transport conduit configured for connecting the water wash tower to the wet desulfurization device such that water from the water wash tower is transportable to the wet desulfurization device after that water has passed through the water wash tower to remove ammonia from within the flue gas passing therethrough. The ammonia removed from the flue gas can be within the water transported to the wet desulfurization device via the desulfurization device water transport conduit.

The above described and other features are exemplified by the following figures and detailed description.

BRIEF DESCRIPTION OF THE DRAWINGS

Referring now to the figures, which are exemplary embodiments, and wherein the like elements are numbered alike.

Other details, objects, and advantages of embodiments of the innovations disclosed herein will become apparent from the following description of exemplary embodiments and associated exemplary methods.

DETAILED DESCRIPTION

Disclosed herein is a plant such as a power plant, utility plant, or industrial plant, including an apparatus for integrating desulfurization and carbon capture within a plant, and a method of practicing the same that can be configured to reduce emissions such as air pollution. Embodiments of the apparatus for integrating desulfurization and carbon capture can be utilized in various types of industrial facilities.

Figure 1:
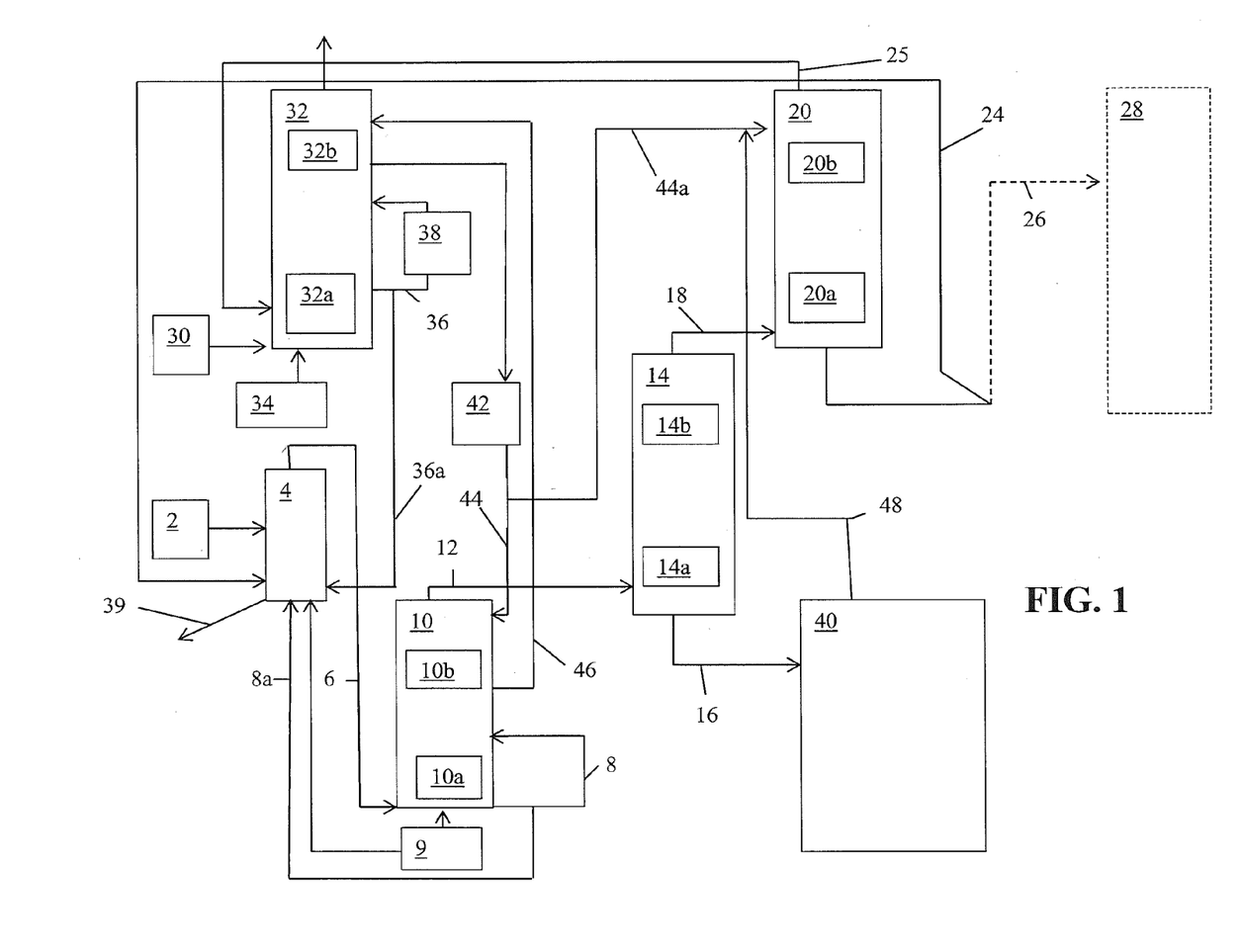
FIG. 1 is a block diagram of a first exemplary embodiment of an apparatus for integrating desulfurization and carbon capture within a plant such as a utility plant, power plant, or an industrial plant.
Figure 2:
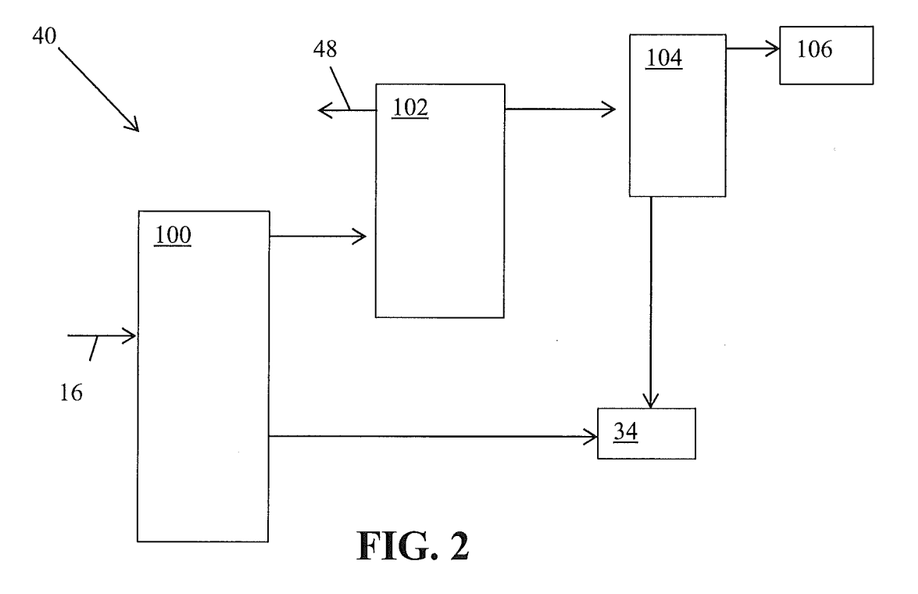
FIG. 2 is a block diagram of an exemplary carbon processing system that can be included within the first exemplary embodiment of the apparatus for integrating desulfurization and carbon capture within a plant.
Figure 3:
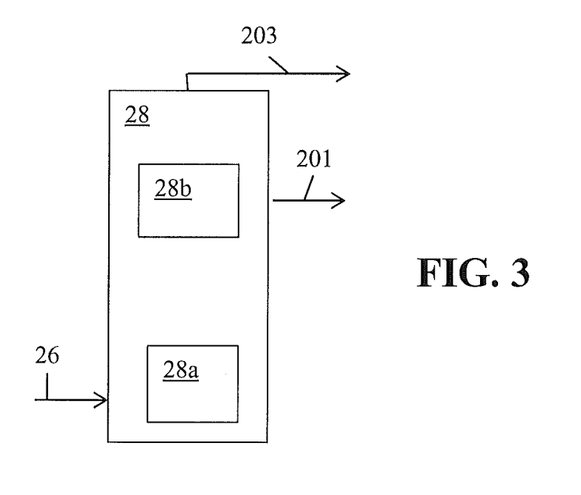
FIG. 3 is a block diagram of an exemplary stripper that can be included within the first exemplary embodiment of the apparatus for integrating desulfurization and carbon capture within a plant.

Referring to FIGS. 1-3, a power plant, a utility plant or an industrial plant can include an apparatus for integrating desulfurization and carbon capture within the plant. The plant can include a combustor 2. The combustor can be a source of fluid, such as flue gas. The flue gas is fed from the combustor 2 to a desulfurization unit such as a wet desulfurization device that is configured to remove sulfur oxides from the flue gas. A pipe or other conduit can be connected between the combustor 2 and the desulfurization device 4 to facilitate the transport of the flue gas to the desulfurization device 4.

In some embodiments, the desulfurization device 4 can be an ammonium sulfate absorber configured to remove sulfur oxides as well as acid gas elements (e.g. HF, HCl, etc.) from the flue gas by presenting ammonia to the flue gas to react with the sulfur oxides and acid gas elements within the flue gas. When reacting with the sulfur oxides, ammonium sulfate is formed by oxidizing ammonium sulfite and/or bisulfate salt. The desulfurization device 4 can be configured to operate at a pH level of between 4 and 6.5 or is configured to operate at a pH level that is maintained at or near preselected pH level such as at or near 5.5 (e.g. at between 4 and 6.5, between 5.5 and 6.0, or between 5.3 and 5.7). The desulfurization device 4 can be configured to operate at relatively high pH levels than would otherwise be used in conventional systems for some embodiments due to the location of the direct contact cooling device 10 and the fact that the direct contact cooling device 10 can receive flue gas directly from the desulfurization device 4 in those embodiments. For embodiments that utilize this configuration, the direct contact cooling device 10 can be configured to allow for ammonia content of the flue gas received from the desulfurization device 4 to be controlled downstream.

In other embodiments, different types of desulfurization devices can be configured to utilize ammonia ($NH_3$) to absorb sulfur oxides ($SO_x$, e.g. $SO_2$, $SO_3$, etc.) from the flue gas. The desulfurization device 4 can include a pre-scrubber that runs at lower pH levels as well. Such a pre-scrubber can alternatively be a separate device that receives the flue gas from the combustor 2 prior to the flue gas being fed to the desulfurization device 4. In embodiments of the plant and apparatus, additional devices can be present though not shown in FIG. 1 as well. For instance, an upstream particulate control device, nitrous oxide control equipment, and other devices can be included in the plant to receive flue gas from the combustor to treat or process the flue gas from the combustor. A turbine or other mechanism can also be included that receives steam from the combustor to utilize the steam. Additionally, a wet electrostatic precipitator for removing fine particulates can be included in embodiments of the plant and embodiments of the apparatus to receive flue gas and remove particulates from the flue gas. The particulates collected from the flue gas can be recycled for use in other processes of the plant or be disposed of in an environmentally acceptable way.

Flue gas can be transported from the desulfurization device 4 to a direct contact cooling device 10. A direct contact cooling device flue gas feed conduit 6 can be connected between the desulfurization device 4 and the direct contact cooling device 10 for facilitating the transport of the flue gas to the direct contact cooling device 10. The flue gas leaving the desulfurization device 4 can be saturated with water relative to ammonium sulfate solution that can be utilized in the desulfurization device for removal of sulfur oxides and other acid gas elements. The flue gas output from the desulfurization device 4 can have a temperature when fed to the direct contact cooling device such as a temperature of between 40-80° C. For example, the flue gas output from the desulfurization device 4 for feeding to the direct contact cooling device 10 can have a temperature within the temperature range of 50-60° C. The flue gas can pass through the direct contact cooling device 10 to be cooled to a preselected temperature or to be cooled within a preselected temperature range such as a temperature of 25° C. or a temperature range of 5-35° C. Residual contaminants from the flue gas can also be captured in the direct contact cooling device 10.

A source of an ammonia reagent 9 can be connected to the direct contact cooling device 10 and to the desulfurization device 4 by conduits to feed the ammonia reagent to a first stage 10a of the direct contact cooling device 10 and to the desulfurization device 4. The source of the ammonia reagent 9 can be a tank or other type of vessel that retains the ammonia reagent until that reagent is fed to one or more devices via one or more conduits. The ammonia reagent can be supplied to the direct contact cooling device 10 to maintain the pre-selected pH level within the direct contact cooling device 10 or within the first stage 10a of the direct contact cooling device 10. The ammonia reagent can be configured to capture residual acidic gases that are within the flue gas that exit the desulfurization device 4. In addition, there can be a supply of sulfuric acid or other acidic reagent from a source 30 connected between the direct contact cooling device 10 and the source 30 by at least one conduit such that the acidic reagent can be fed to the first stage 10a of the direct contact cooling device 10 to control the pH level in the first stage 10a of the direct contact cooling device 10 in the event of a relatively high ammonia content being present within the flue gas output from the desulfurization device 4.

The direct contact cooling device 10 can include recycle conduit 8 that diverts a portion of fluid passing through the direct contact cooling device to recycle that fluid by feeding the fluid back into another region of the direct contact cooling device. For example, a recycle conduit 8 can be connected to the direct contact cooling device 10 to recycle fluid passing within a first stage 10a of the direct contact cooling device. The fluid being recycled can contain unused portions of the ammonia reagent (e.g. sulfuric acid or other reagent), ammonia, and can also include a product of the reagent reacting with the ammonia (e.g. ammonium sulfate or other product) that can be formed when ammonia within the flue gas passing through the first stage of the direct contact cooling device 10 reacts with the sulfuric acid or other ammonia reagent fed into the direct contact cooling device 10.

A discharge conduit 8a can be connected between the recycle conduit 8 and the desulfurization device 4 to divert a portion of the fluid having the product formed when ammonia and/or sulfur oxides within the flue gas is absorbed by the reagent (e.g. ammonium sulfate) from the recycle conduit 8 to the desulfurization device 4 or to a conduit outputting the product (e.g. ammonium sulfate) from the desulfurization device 4 to merge the product prior to transporting the product to a processing mechanism for processing the product via a common output conduit 39. The discharge conduit 8a can also be considered a bypass conduit or a purge conduit. The portion of the fluid having the product being diverted by the discharge conduit 8a can be controlled so that the content of the recycled fluid has an ammonia reagent concentration, product concentration and/or flow rate that is at a preselected value or within a preselected concentration range.

In some embodiments, an aqueous flow of fluid can be transported from the direct contact cooling device 10 to the desulfurization device 4 via the discharge conduit 8a connected therebetween. The aqueous flow of fluid can contain ammonia, ammonium sulfate, ammonia reagent and/or other elements for use in treating flue gas fed to the desulfurization device 4. This aqueous flow of fluid can be controlled such that a preselected flow rate of the fluid or a preselected flow rate of ammonia, ammonia reagent, ammonium sulfate, or other element of the aqueous flow of fluid is sent from the direct contact cooling device 10 to the desulfurization device 4.

After passing through a first stage 10a of the direct contact cooling device 10, the flue gas passes through a second stage 10b that contacts the flue gas with a flow of water to cool the flue gas. The water passing through the second stage 10b of the direct contact cooling device 10 can directly contact the flue gas to cool that flue gas. The water fed to the direct contact cooling device 10 can be from a source of water or can be from water used in other devices of the plant. The water can be fed to the direct contact cooling device 10 via a water feed conduit 44 that is connected to the direct contact cooling device 10 for feeding water thereto. After the water is passed through the direct contact cooling device to cool the flue gas and/or other fluid passing therethrough, the water that is heated as a result of passing through the hotter flue gas and is output from the second stage 10b of the direct contact cooling device 10 to a water recycle conduit 46 connected between the direct contact cooling device 10 and a direct contact heating device 32. The water can be recycled via the water recycle conduit 46 so that the water is recycled for use in multiple devices. For example, the water used in cooling flue gas in the contact cooling device 10 can subsequently be transported to the direct contact heating device 32 for subsequent use in heating flue gas passed through the direct contact heating device 32 and can also be transported to a water wash tower 20 for use in washing a fluid such as flue gas passed through the water wash tower 20.

After passing through the second stage 10b of the direct contact cooling device 10, the cooled flue gas can be transported to a carbon dioxide absorber 14 via a carbon dioxide absorber feed conduit 12 that connects the direct contact cooling device 10 with the carbon dioxide absorber 14 for transporting the cooled flue gas to the carbon dioxide absorber 14 to be passed through at least a first stage 14a and a second stage 14b of the carbon dioxide absorber 14 to remove carbon dioxide ($CO_2$) from the flue gas. The carbon dioxide absorber 14 could also include more than two stages or could be configured to operate having only one stage. In some embodiments, there can be multiple carbon dioxide absorbers present that each receive a portion of flue gas for treating that portion of flue gas. The carbon dioxide absorber 14 can be configured to utilize ammonia within an ammoniated slurry or ammoniated solution fed to the carbon dioxide absorber 14 to remove carbon dioxide from the flue gas fed therein. In some embodiments, between 80-95% of the $CO_2$ within the flue gas can be removed from the flue gas by the carbon dioxide absorber 14. A flow of fluid that is substantially composed of $CO_2$ can be transported to a carbon processing system 40 via a carbon capture feed conduit 16 that connects the carbon dioxide absorber 14 to the carbon processing system 40 so that fluid that is comprised of the $CO_2$ removed from the flue gas via the carbon dioxide absorber 14 is fed to the carbon processing system 40 for further processing so that an acceptable treatment of the $CO_2$ occurs such as sequestration of the $CO_2$ or processing of the $CO_2$ to form a desirable carbon based product that is useable for resale or other distribution.

The flue gas output from the carbon dioxide absorber 14 is subsequently fed to a water wash tower 20 via a water wash tower flue gas feed conduit 18 that connects the carbon dioxide absorber 14 to the water wash tower 20 for transportation of the flue gas to the water wash tower 20. The water wash tower 20 is configured to treat the flue gas fed therein to remove ammonia from the flue gas. The water wash tower 20 can include a first stage 20a and a second stage 20b that each successively treat the flue gas to remove ammonia from the flue gas. The water wash tower 20 could also include additional stages or can alternatively only have one stage. The flue gas can enter the water wash tower 20 having an ammonia content of 10,000 parts per million (ppm) or other preselected concentration or preselected concentration range such as a preselected concentration within the range of 6,000 parts per million by volume (ppmv) to 15,000 ppmv. After treatment by the water wash tower 20, the flue gas can be exited from the water wash tower 20 having an ammonia content that is at or below a preselected concentration or concentration range. For example, in some embodiments the ammonia content of the flue gas exiting the water wash tower 20 can be at or below 500 ppm, 200 ppm, 100 ppm, or 50 ppm.

The water wash tower 20 can receive water from different devices or sources for use in contacting the flue gas for removing ammonia from the flue gas. For instance, water from a carbon dioxide wash device of the carbon processing system 40 can be fed to the water wash tower 20 via a carbon dioxide wash water conduit 48. Water fed from the carbon dioxide wash water conduit 48 can include dissolved ammonia, carbon dioxide, and products of ammonia reacting with carbon dioxide and/or water (e.g. $H^+$, $OH^-$, $NH_4^+$, $NH_2COO^-$, $HCO_3^-$, $CO_3^{2-}$). A portion of the water used in the cooling and heating of flue gas via the direct contact cooling device 10 and direct contact heating device 32 can also be transported to the water wash tower 20 via a water wash tower water feed conduit 44a connected between the direct contact heating device 32 and the water wash tower 20. The water from the water wash tower water feed conduit 44a can be merged with the water from the carbon dioxide wash water conduit 48 prior to the water being fed to the water wash tower 20.

Water output from the water wash tower 20 after the water has absorbed ammonia from the flue gas passing therethrough can be transported to the desulfurization device 4 via a desulfurization device water transport conduit 24 connected between the water wash tower 20 and the desulfurization device 4. The flow of this used wash water from the desulfurization device water transport conduit 24 can provide ammonia within that water for use in the desulfurization device 4 for reacting with sulfur oxides within the flue gas fed to the desulfurization device 4 for use in removing the sulfur oxides from the flue gas and can also react with other residual acidic gases present within the flue gas (e.g. HCl, HF, etc.).

In some embodiments, a portion of the water having ammonia exiting the water wash tower 20 is divertable to the desulfurization device 4 via the desulfurization device water transport conduit 24 while another portion of the water is fed to a stripper feeding conduit 26 for feeding to a stripper 28, which are both shown in broken line in FIG. 1. The stripper feeding conduit 26 can connect the water wash tower 20 to the stripper 28 such that water from the water wash tower 20 is feedable to the stripper 28 for further processing by the stripper 28. The stripper 28 can receive steam or other fluid to process the water fed to the stripper 28 to separate ammonia from the water fed to the stripper. For instance, ammonia can be separated from the water and fed to another device while water treated by the stripper 28 to have substantially less ammonia can be fed to the water wash tower 20, direct contact cooling device 10, direct contact heating device 32, and/or another device for subsequent use of that water.

As best shown in FIG. 3, the stripper 28 can include multiple stages such as a first stage 28a and a second stage 28b that are configured for processing the water to separate the ammonia from the water. The separated ammonia can be sent from the stripper 28 to the desulfurization device 4 and/or the carbon dioxide absorber 14 via a stripper ammonia output conduit 203 connected between the stripper 28 and the desulfurization device 4 and/or carbon dioxide absorber 14. The water can be fed to the water recycle conduit 46 for feeding to the direct contact heating device 32 via stripper water output conduit 201 connected between the stripper 28 and the water recycle conduit 46.

A direct contact heating device feed conduit 25 can connect the water wash tower 20 to the direct contact heating device 32 for transport of a fluid such as the flue gas from the water wash tower 20 to the direct contact heating device 32. The flue gas exiting the water wash tower 20 can be transported via the direct contact heating device feed conduit 25 to the direct contact heating device 32 for heating of the flue gas and further removal of residual ammonia from the flue gas prior to the flue gas being directed to an outlet stack for emitting out of a plant to the atmosphere of the Earth that is external to the plant. For instance, the direct contact heating device 32 can be configured to heat the flue gas fed therein to a preselected temperature or preselected temperature range such as a temperature of between 40-60° C. prior to being fed to the outlet stack for emission of the flue gas.

A source of an acidic reagent 30 such as sulfuric acid or other acidic reagent can be connected to the direct contact heating device 32 via an acidic reagent conduit for feeding the acidic reagent to a first stage 32a of the direct contact heating device 32. The source of the acidic reagent can be a tank or other vessel that retains the acidic reagent for feeding the reagent to the direct contact heating device 32 and/or other devices via one or more conduits connected thereto. Fluid from at least one vessel 34 or other source such as steam or other fluid from the carbon processing system 40 can also be sent to the first stage 32a of the direct contact heating device 32 for use in heating the flue gas fed to the direct contact heating device 32.

A recycle conduit 36 can be connected to the first stage 32a of the direct contact heating device 32. The recycle conduct 36 can recycle fluid passing through the first stage 32a of the heating device 32 that contains the acidic reagent or a product of the reaction of the acidic reagent with the ammonia present in the flue gas fed to the direct contact heating device. For example, when the acidic reagent includes sulfuric acid, the product can include ammonium sulfate. The recycle conduit 36 can include a heat exchanger 38 or be configured so that a portion of the conduit passes through a heat exchanger so that fluid passing through the recycle conduit 36 is at a preselected temperature or temperature range prior to being reintroduced into the direct contact heating device 32. Fresh water from a source of water can also be utilized in case fluid from other sources is not available and/or to provide a source of water to make-up for losses of water that could result from evaporation in the direct contact heating device 32 that can occur due to heating of the flue gas and/or from losses of water that may result from purging fluid that can contain the product of the acidic reagent reacting with ammonia within the flue gas of the direct contact heating device 32. A direct contact heating device purge conduit 36a can be connected to the recycle conduit 36 of the first stage 32a of the direct contact heating device 32. Fluid containing the product can be diverted to the desulfurization device 4 or to a conduit receiving fluid from the desulfurization device 4 so that the fluid containing the product can be transported to a processing device.

For instance, when the desulfurization device 4 is an ammonium sulfate absorber and the acidic reagent fed to the direct contact heating device is sulfuric acid, the ammonium sulfate product within the recycle conduit 36 can be diverted to a desired extent to the desulfurization device 4 via the direct contact heating device purge conduit 36a. For such embodiments, the ammonium sulfate containing fluid from these devices can be merged so that the ammonium sulfate containing fluid can be transported to a processing facility utilizing a common output conduit 39. For embodiments where the acidic reagent is sulfuric acid and that reagent is also fed to the direct contact cooling device 10, a portion of the fluid containing this product can be transported from the direct contact cooling device 10 to the common output conduit 39 via the discharge conduit 8a connected between the direct contact cooling device recycle conduit 8 and the desulfurization device 4. The common output conduit 39 can transport the product to a processing system for processing that material.

After passing through the first stage 32a of the direct contact heating device 32, the flue gas can pass through a second stage 32b of the direct contact heating device 32. Water used to cool the flue gas within the direct contact cooling device 10 can be subsequently fed to the direct contact heating device 32 via water recycle conduit 46 connected between the direct contact cooling device 10 and the direct contact heating device 32. The water that was used as the cooling water in the direct contact cooling device 10 was heated when contacted by the flue gas within the direct contact cooling device 10 to cool that flue gas such that the heated water can subsequently pass into the direct contact heating device 32 and contact flue gas within the second stage 32b of the direct contact heating device 32 so that heat from the water is transported to the flue gas. The water is cooled by transporting its heat to the flue gas to heat the flue gas in the direct contact heating device 32. The cooled water is subsequently output from the direct contact heating device 32 to a conduit for transport to a cooling tower 42 to help ensure the water is cooled to a preselected temperature or is within a preselected temperature range prior to being fed to the direct contact cooling device 10 via the water feed conduit 44 connected between the direct contact heating device 32 and the direct contact cooling device 10. A portion of the water from the direct contact heating device 32 is also divertable or feedable to the water wash tower 20 via the water wash tower water feed conduit 44a, which can be connected to the water feed conduit 44 or the cooling tower 42 for feeding the water to the water wash tower 20.

Embodiments of the plant and embodiments of the apparatus for integrating desulfurization and carbon capture within a plant can include a number of different types of carbon processing systems.

As best shown in FIG. 2, one example of such a carbon processing system 40 can include a regenerator 100, a carbon dioxide wash tower 102, and a carbon dioxide processing device 104 that is configured to output carbon dioxide product to a carbon dioxide product retention vessel 106. The carbon dioxide processing device 104 can be comprised of a series of compressor stages with intercooling to increase the pressure of the carbon dioxide product. The intercooling and at least one separator device used in the carbon dioxide processing device 104 can help condense moisture from the carbon dioxide product to increase the purity of the product. Steam exiting the carbon dioxide processing device 104 can be fed to a vessel 34 or conduit for transporting that steam to the first stage 32a of the direct contact heating device 32. The regenerator 100 may also utilize steam and output steam that is used in the regenerator to a vessel or conduit for transporting to the first stage 32a of the direct contact heating device 32. Fluid treated by the regenerator 100 can contain carbon dioxide and be subsequently sent to a carbon dioxide wash tower 102 prior to the fluid having carbon dioxide being passed to the carbon dioxide processing device 104 for treatment and generation of carbon dioxide product. In some embodiments, wash water used in the carbon dioxide wash tower 102 can be output from the carbon dioxide wash tower 102 via the carbon dioxide wash water conduit 48 to transport the water to the water wash tower 20 so that the water can be subsequently used for washing of the flue gas fed to the water wash tower 20.

Figure 4:
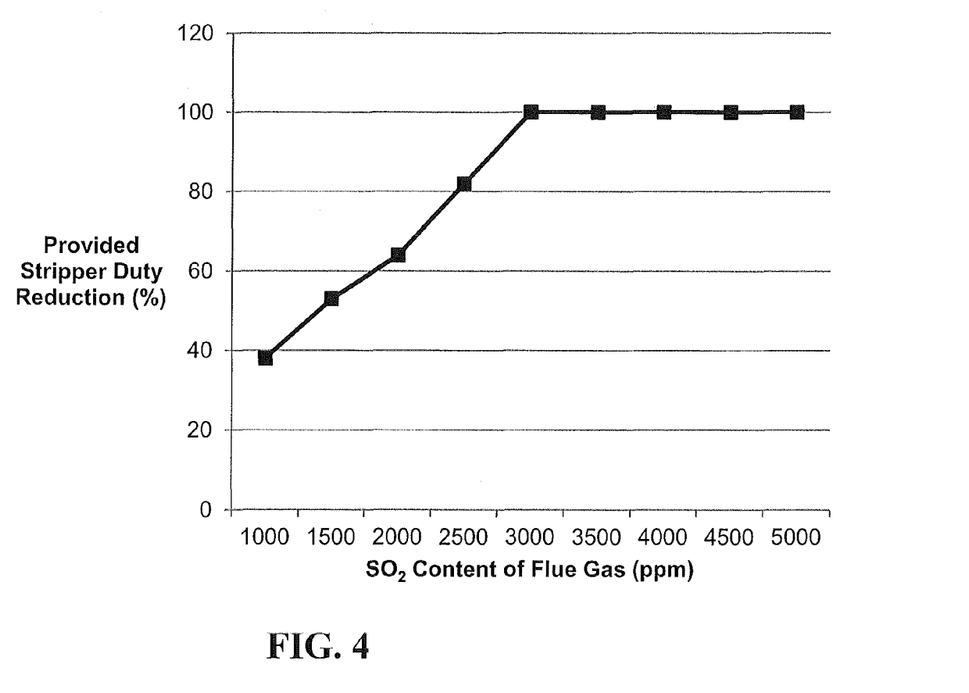
FIG. 4 is a chart illustrating a reduction in stripper duty or an elimination of a stripper that can be achieved by use of embodiments of the apparatus for integrating desulfurization and carbon capture within a plant such as a utility plant or an industrial plant.

Embodiments of the plant and embodiments of the apparatus for integrating desulfurization and carbon capture within a plant can provide substantial operational costs savings in addition to capital cost savings. Depending on the content of the flue gas, which can depend on the type of fuel (e.g. a type of coal or oil) being combusted in a combustor, embodiments may not need a stripper device such as stripper 28 or may only need a much smaller stripper device. For instance, as can be appreciated from FIG. 4, flue gas having a sulfur dioxide ($SO_2$) content that is at 1,000 ppm $SO_2$ fed to the desulfurization device 4 can utilize a stripper that requires only 60% of the steam a conventional stripper would need. This can provide substantial operational cost savings as less steam is needed for the system and can also provide capital costs savings by reducing the size of the needed stripper for embodiments of the plant. In embodiments where the $SO_2$ content of the flue gas fed to the desulfurization device 4 is to be at or above 3,000 ppm, it has been determined that 100% of the stripper duty is no longer needed (i.e. the stripper is not necessary). In such embodiments, stripper 28 may not be included in embodiments of the plant or a relatively small capacity stripper may be utilized to provide a backup system in case of a process failure or to assist with start-up operations of a plant. For those embodiments, substantial capital and operational costs savings are obtained.

It has been determined that the reduced steam duty required for the stripper 28 or the non-involvement of a stripper 28 for embodiments of the plant can result from use of the water from the direct contact heating device 32 being sent to the water wash tower 20. The avoidance of the inclusion of significant levels of any acidic solution within the water from the second stage of the direct contact heating device 32 can avoid the need for expensive materials of construction for the water tower 20 and/or stripper 28. The apparatus can therefore be configured so that water from the second stage 32b of the direct contact heating device 32 that is sent to the water wash tower 20 is relatively pure water that does not have a significant acidic content so that the water from the direct contact heating device 32 fed to the water wash tower 20 does not contaminate the water wash tower 20 and/or stripper loop (for embodiments where the stripper 28 is present).

Additionally, the transport of water from the water wash tower 20 to the desulfurization device 4 via desulfurization device water transport conduit 24 facilitates the reduction in costs. The water from the wash tower 20 fed to the desulfurization device 4 can contain ammonia that is formed when that water is passed through the water wash tower and exposed to the flue gas to absorb ammonia therein. The ammonia captured by this water is fed to the desulfurization device 4 to help assist in the desulfurization process. The recycling of the water in this fashion provide costs savings by permitting the removed ammonia to be efficiently and effectively utilized in the desulfurization processing of the flue gas to remove sulfur oxide pollutants from the flue gas.

In addition to reducing costs, embodiments of the plant and embodiments of the apparatus for integrating desulfurization and carbon capture within a plant can help reduce the amount of ammonia emitted out of an outlet stack to the atmosphere, which reduces air pollution that can be emitted by the plant. For instance, it is contemplated that embodiments can emit flue gas out of an outlet stack having an ammonia concentration of 20 ppm, less than 20 ppm, 10 ppm or less than 10 ppm. It is contemplated that the acidic reagent being fed to the direct contact heating device 32 prior to that flue gas being heated by the water passing through the second stage 32b of the direct contact heating device 32 contributes to this improved reduction of ammonia within the emitted flue gas. The acidic reagent fed to the direct contact heating device helps absorb additional ammonia from the flue gas for removal of ammonia from the flue gas prior to the flue gas being passed to an outlet stack.

It should be appreciated that various changes can be made to embodiments of the apparatus for integrating desulfurization and carbon capture within a plant to account for different design criteria. For example, the size, shape or configuration of conduits for transporting different fluids to and from different elements of the apparatus can be any of a number of suitable shapes, sizes, or configurations and include any of a number of different conduit elements such as vessels, valves, pipes, tubes, tanks, or ducts that have the flow rate of fluid affected by pumps, fans or fluid flow control mechanisms connected to or in fluid communication with such elements. Each conduit could also be considered a section of a larger system of conduits or be considered sections of a solitary conduit system used to transport fluids throughout a plant. Additionally, the cooling tower 42, heat exchanger 38, direct contact cooling device 10, direct contact heating device 32, water wash tower 20, and other devices can be configured to operate in a concurrent flow or a countercurrent flow configuration as desired to meet a particular set of design criteria or design objectives. As yet another example, any acidic reagent can be utilized that can react with ammonia to help facilitate the removal of ammonia from flue gas that meets a set of design criteria. The temperatures and/or pressures at which the flue gas, wash water, acidic reagent, or other fluid flows are to be maintained at or kept can also be any of a number of suitable ranges to meet a particular set of design objectives. As another example, the types of pumps, fans, or other mechanisms used to control or drive fluid flows throughout the apparatus can be any arrangement of such mechanisms that can meet a particular set of design criteria. As yet another example, embodiments of the apparatus for integrating desulfurization and carbon capture can be configured to utilize one or more devices of the apparatus (e.g. utilize one or more carbon dioxide absorbers, direct contact cooling devices, wash towers, direct contact heating devices, etc.) and one or more conduits utilized for transporting fluid between those devices. Additionally, an arrangement of sensors, one or more controllers, and other automated process control mechanisms can be included in the plant to meet a particular set of design criteria for monitoring and controlling operations of the plant or at least one device of the plant.

While the invention has been described with reference to various exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for operating a plant, comprising:
feeding a reagent to a direct contact heating device for removing ammonia from fluid fed to the direct contact heating device prior to water being contacted with the fluid to heat the fluid;
feeding the water to the direct contact heating device to contact the fluid after the fluid is contacted with the reagent fed to the direct contact heating device; and
feeding the water from the direct contact heating device to a water wash tower that is downstream of a carbon dioxide absorber configured to use ammonia to remove carbon dioxide from fluid fed therein, the water wash tower being configured to remove ammonia from fluid fed therein.

2. The method of claim 1, comprising:
feeding flue gas from a desulfurization device to a direct contact cooling device to cool the flue gas prior to the flue gas being sent to the water wash tower; and
sending an aqueous flow of fluid from the direct contact cooling device to the desulfurization device, the aqueous flow of fluid comprising at least one of ammonia and ammonium sulfate.

3. The method of claim 1, wherein a stripper is not utilized for processing any fluid from the water wash tower.

4. The method of claim 1, comprising:
feeding fluid from the water wash tower to the direct contact heating device, the fluid having a concentration of ammonia that is at 500 parts per million (ppm) or below 500 ppm.

5. The method of claim 1, comprising:
recycling a portion of the water fed to the direct contact heating device to a direct contact cooling device for cooling fluid passing through the direct contact cooling device; and
recycling a portion of the water from the direct contact cooling device back to the direct contact heating device after the water passes through the direct contact cooling device for cooling the fluid passing through the direct contact cooling device.

6. The method of claim 1, comprising:
feeding wash water from the water wash tower that includes at least a portion of the water fed from the direct contact heating device to a wet desulfurization device for removing sulfur oxides from flue gas fed to the wet desulfurization device using at least a portion of the wash water.

7. The method of claim 6, comprising:
combining ammonium sulfate output from the direct contact heating device with ammonium sulfate output from the wet desulfurization device.

8. The method of claim 7, comprising:
combining ammonium sulfate output from a direct contact cooling device with the ammonium sulfate output from the direct contact heating device and the ammonium sulfate output from the wet desulfurization device.

9. The method of claim 7, wherein the wet desulfurization device is an ammonium sulfate absorber.

10. The method of claim 7, comprising:
operating the wet desulfurization device at a pH level of between 4 and 6.5.

* * * * *

UNITED STATES PATENT AND TRADEMARK OFFICE
CERTIFICATE OF CORRECTION

PATENT NO.       : 9,452,389 B2                    Page 1 of 1
APPLICATION NO.  : 14/193245
DATED            : September 27, 2016
INVENTOR(S)      : Dube et al.

It is certified that error appears in the above-identified patent and that said Letters Patent is hereby corrected as shown below:

On the Title Page

Item (57), Line 6, delete "contract" and insert -- contact --, therefor.

In the Claims

Column 8, Line 10, Claim 11, delete "conduct" and insert -- conduit --, therefor.

Signed and Sealed this
Third Day of January, 2017

Michelle K. Lee
*Director of the United States Patent and Trademark Office*